United States Patent Office 3,115,925
Patented Dec. 31, 1963

3,115,925
METHOD OF BURNING FUEL
Richard C. Ulmer, Hastings on Hudson, and James Deane Sensenbaugh, Peekskill, N.Y., and William L. Livingston III, Chattanooga, Tenn., assignors to Combustion Engineering, Inc., New York, N.Y., a corporation of Delaware
No Drawing. Filed Jan. 4, 1957, Ser. No. 632,430
2 Claims. (Cl. 158—117.5)

This invention relates to an improved method of burning fuel and has particular relation to a method involving the starting up procedure for burning a fuel within a fluidized bed of solid particulate material.

It is well recognized in the art that a bed of finely divided particulate solid material can be made to resemble a highly agitated or vigorously boiling body of liquid by passing a gas upwardly through the mass at a velocity sufficient to lift the bed but not entrain the particles therefrom. The actual velocity range during which satisfactory fluidization occurs depends upon the average size of the particles, their density, density of the gas and several other recognized variables. In general, however, fluidization is a well-kown phenomena and workers in the art familiar therewith can design large scale fluidization systems.

Characteristically of fluidization, the rapid random movement of the particles inside the bed results in substantial uniformity of temperature throughout the bed. In addition to the uniformity of temperature, the rapid movement of the individual particles and the large heat capacity of the bed as a whole causes an extremely rapid heat exchange rate between the fluidized bed and any heat exchange surfaces imbedded therein. It has been found that when fuel is introduced into such a bed along with combustion supporting air, an efficient combustion will take place inside the fluidized bed at an extremely high rate of heat release. It has been found possible to have a much higher rate of heat release and heat absorption from combustion in a fluidized bed than with conventional combustion arrangements. Large areas of heat exchange surface may be imbedded directly in the fluidized bed without interfering with fluidization. Furthermore the wall surface surrounding the fluidized bed may in itself be a heat exchange surface.

When utilizing a fluidized bed as a combustion system and recovering the heat of combustion, as for example, by producing or super heating steam, the combustion temperatures should be maintained at a relatively high level, e.g. 2,000° F. Thus the material of which the fluidized bed is comprised must be able to withstand the high temperatures as well as the severe self-erosion characteristic of fluidization. Ceramic material, notably aluminum oxide and mixtures of aluminum oxide and silicon dioxide, have been found most satisfactory. With such materials for the fluidized bed substantially 100% combustion efficiency has been obtained with natural gas as the fuel at a bed temperature of 2,200° F. The bed was made up of a material that was 78% aluminum oxide and 22% silica. Actually to obtain the highest combustion efficiency and the most advantageous recovery of heat it is necessary to have the temperature in the range of 1,800 to 2,200° F.

However, a serious problem exists with respect to starting up such a fluidized combustion unit. It is in fact necessary to preheat the bed to a surprisingly high temperature before ignition of the gaseous fuel will occur. In the aforementioned instance wherein a fluidized bed was comprised of 78% alumina and 22% silica it was necessary to preheat the bed to 1150° F. before natural gas would ignite and combust with the air supply. As a result auxiliary equipment for starting up, such as over-size air furnaces, are required for the occasional times when the unit is started up after a shut-down.

The object of this invention is to provide a start-up procedure wherein the ignition temperature of the fluidized bed is greatly lowered.

Briefly stated the procedure provided by this invention involves spraying or otherwise introducing onto the bed of particulate material a catalyzing solution of a metal salt, and thereafter preheating the bed until ignition temperature has been reached. The dried residue of the salt remaining on the surface of the particles in the fluidized bed catalyze the ignition of the natural gas and the air at a much lower temperature than the 1150° F. which would otherwise be the ignition point.

Preferably an aqueous salt solution should be used, although non-aqueous solutions or even liquid suspensions of finely divided solids can be satisfactorily employed, and the term catalyzing solution is intended to include such suspensions. Also the catalyzing portion of the salt may be the anion or the cation or both. Thus, for example, salt of the following metals have been found satisfactory: platinum, palladium, rhodium, ruthenium, silver, copper, chromium, manganese, nickel, vanadium and cobalt. The following cations have also been found satisfactory, namely, the permanganates, the chlorate, the iodates and the bromates.

At the time the solution is introduced into the material, the temperature of the material should be below the vaporization temperature of the solution in order that the solution may penetrate deeply into the bed of fluidized material. With a water solution, satisfactory results were obtained by introducing the solution when the bed temperature was 200° F. after introducing the solution, the fluidized bed is heated to a temperature at which the salt becomes catalytically activated. The actual catalytic state will, of course, vary with the different salt. Thus, for example, in the instance of the catalytic metals, the salt will decompose in the presence of the preheating air leaving the metal and oxides of the metal deposited on the material. The temperature at which this will take place varies with the particular salt but since the bed with the catalyst applied thereto must be heated to a range generally between 500 and 700° F. before it will oxidize fuel and since this is well above the temperature required for this decomposition the temperature of the bed is raised to within this range preparatory to introducing fuel thereinto with the decomposition taking place during this heating of the bed. The bed may be heated to this temperature range in any desired manner with the passing of a stream of 600° F. air upwardly therethrough having been found very satisfactory. The bed temperature is gradually raised to approximately that of the air. It has been found preferable to maintain the bed of material in a fluidized state during the introduction of the catalyzing salt solution and during the heating of the bed to this 500 to 700° F. range since with a fluidized bed the distribution of the solution throughout the bed is very greatly enhanced and moreover, during the heating process a very much enhanced drying action is obtained. Thus, in heating the bed, preferably by passing a stream of hot air upwardly through the bed and maintaining the bed in a fluidized condition, the solution on the particles is dried and decomposed leaving the metal and its oxides on the particulate material. Immediately after thus drying the solution and heating the bed, fuel is introduced into the bed together with combustion supporting air with the bed then being capable of oxidizing the fuel at this relatively low temperature of 500–700° F. and with the oxidation then taking place with this oxidation raising the temperature of the bed to its operating range of 1800–2200° F.

In accomplishing this result solutions of salts of the following metals have been found satisfactory—platinum, palladium, rhodium, ruthenium, silver, copper, chromium, manganese, nickel, vanadium and cobalt. In coating the material of the bed with an oxidation catalyst the temperature at which combustion or oxidation of a fuel can be initiated is greatly lowered. However, experience has shown that after some hours of use the thus treated material loses considerable of its ability to initiate oxidation of the fuel although the bed will possess excellent fuel burning efficiency at the previously mentioned operating temperature. Therefore, when a burner of the type here referred to is lit the aforementioned process is resorted to.

The following are illustrative examples of the results obtained with the method of this invention with the material of the bed being 78% $Al_2O_3$ and 22% $SiO_2$ and being referred to as "base" in the table:

| Material Treatment | Initiation Temp., °F. | Efficient Oxidation ture, °F. |
|---|---|---|
| Base—no treatment | 1,150 | 2,200 |
| Base×5% $Cr_2O_3$ | 600 | 1,900 |
| Base×5% $Cu(CrO_2)_2$ | 600 | 2,000 |
| Base×6% CuO | 600 | 1,900 |
| Base×0.2% Pt | 600 | 1,900 |
| Base×15% $Cr_2O_3$ | 500 | 1,900 |

The solution should be added slowly to the bed of material and in adding a solution of copper oxide it was found that with 100 lbs. of pellets of (78% $Al_2O_3$ and 22% $SiO_2$) 1½ gallons of solution containing 5 lbs. CuO as copper nitrate was entirely satisfactory.

Thus with applicant's method the difficult task of initiating operation of a fluidized bed burner is accomplished in a simple and expeditious manner.

It will be understood that the above description is intended for the purpose of illustration only and that modifications such as will occur to those skilled in the art are possible and are embraced within the scope and spirit of the invention.

What is claimed is:
1. The method of initiating operation of and burning a fuel in a bed of particulate material that is capable of withstanding temperatures in the range of 1800 to 2200° F. without being deleteriously affected but within which bed of material said fuel would not oxidize below a predetermined high temperature comprising introducing into said bed of material a solution of an oxidizing catalyst with the bed of material being at a temperature below the vaporization temperature of the solution, thereafter heating the bed sufficiently to dry said solution and convert the dried residue deposited on the surface of the material of the bed to an oxidation catalyst which is effective to substantially lower the temperature at which oxidation of said fuel within said bed may be initiated to a value below said predetermined high temperature and to catalyze the oxidation of the fuel but which loses a substantial portion of its ability to catalyze the oxidation of the fuel upon being heated to the range of 1800 to 2200° F., continuing to heat said bed in situ to the lower initial temperature at which said fuel will be oxidized therein, thereafter and in situ introducing said fuel together with air into said bed while maintaining the bed fluidized, oxidizing the fuel in the bed, regulating the supply of fuel to the bed to raise the temperature of the bed to the range of 1800 to 2200° F. where sustained operation is maintained, terminating the supply of fuel and air when it is desired to terminate operation and repeating the aforementioned operations when it is desired to re-establish operation.

2. The method of initiating operation of and burning fuel in a bed of particulate material that is capable of withstanding temperatures in a given high range without being deleteriously effected but within which bed of material said fuel would not oxidize below a predetermined temperature, comprising introducing into said bed of material a solution of an oxidation catalyst with the bed of material being at a temperature below the vaporization temperature of the solution, thereafter heating said bed during which heating said solution is dried and decomposed with an oxidation catalyst being deposited on the surface of the material that is effective to substantially lower the temperature at which oxidation of said fuel within said bed may be initiated to a value below said predetermined temperature but with the catalyst losing a substantial portion of its ability to catalyze the oxidation of fuel when heated to said given high temperature range, continuing to heat said bed in situ and raise it to a temperature such that said fuel will be oxidized therein but well below said predetermined temperature and below the temperature at which the oxidation process could be initiated without the deposition of the catalyst on the material, thereafter and in situ introducing said fuel together with air into said heated bed while maintaining the same fluidized, oxidizing the fuel in the bed, regulating the supply of fuel to the bed to raise the temperature of the bed to said given high range and whereat efficient oxidation of the fuel is had, terminating the supply of fuel and air when it is desired to terminate operation and repeating the aforementioned operation in situ when it is desired to reestablish operation.

References Cited in the file of this patent
UNITED STATES PATENTS

| 894,110 | Bloss | July 21, 1908 |
| 2,638,684 | Jukkola | May 19, 1953 |
| 2,729,428 | Milmore | Jan. 3, 1956 |
| 2,842,102 | Blaskowski | July 8, 1958 |
| 2,865,868 | McKinley et al. | Dec. 23, 1958 |

FOREIGN PATENTS

| 15,414 | Great Britain | Sept. 17, 1898 |

OTHER REFERENCES

Haslam and Russell: Fuels and Their Combustion, McGraw-Hill Book Co., New York, 1926, pages 304–310.